(12) United States Patent
Enderwick et al.

(10) Patent No.: US 7,389,529 B1
(45) Date of Patent: Jun. 17, 2008

(54) METHOD AND APPARATUS FOR GENERATING AND USING NESTED ENCAPSULATION DATA

(75) Inventors: Thomas Jeffrey Enderwick, San Jose, CA (US); Dario Meluzzi, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 762 days.

(21) Appl. No.: 10/452,669

(22) Filed: May 30, 2003

(51) Int. Cl.
*H04L 9/00* (2006.01)

(52) U.S. Cl. .................... 726/1; 713/150; 713/165; 713/167

(58) Field of Classification Search ............. 713/150, 713/160, 164–167; 726/1, 3, 15, 30
See application file for complete search history.

(56) References Cited

U.S. PATENT DOCUMENTS

| | | | | |
|---|---|---|---|---|
| 5,764,645 A | * | 6/1998 | Bernet et al. | 370/395.52 |
| 6,587,431 B1 | * | 7/2003 | Almulhem et al. | 370/229 |
| 6,618,388 B2 | * | 9/2003 | Yip et al. | 370/401 |
| 6,993,037 B2 | * | 1/2006 | Boden et al. | 370/401 |
| 7,124,303 B2 | * | 10/2006 | Candelore et al. | 713/193 |

OTHER PUBLICATIONS

D. Harkins, et al., "The Internet Key Exchange (IKE)," Nov. 1998, Request for Comments: 2409, pp. 1-41.

S. Kent, et al., "IP Encapsulating Security Payload (ESP)," Nov. 1998, Request for Comments: 2406, pp. 1-22.
A. Conta, et al., "Generic Packet Tunneling in IPv6 Specification," Dec. 1998, Request for Comments: 2473, 31 pages.
S. Kent, et al., "Security Architecture for the Internet Protocol," Nov. 1998, Request for Comments: 2401, pp. 1-66.
D. Maughen, et al., "Internet Security Association and Key Management Protocol (ISAKMP)," Nov. 1998, Request for Comments: 2408, pp. 1-86.
Cisco Systems, Inc., "IPSEC, An Introduction to IP Security (IPSec) Encryption," copyright 2002-2003, http://www.cisco.com/en/US/tech/tk583/tk372/technologies_tech_note09186a0080094203.shtml, printed Aug. 27, 2003, pp. 1-24.
Cisco Systems, Inc., "Cisco IOS Software Releases 12.0 Mainline, Cisco Encryption Technology," copyright 1992-2003, http://www.cisco.com/en/US/tech/tk583/tk372/technologies_tech_note09186a0080094203.shtml, printed Aug. 27, 2003, pp. 1-42.
Schneier, B., "Combining Block Ciphers" from Applied Cryptography, Chapter 15.1, pp. 357 and 358.
Schneier, B., "Combining Block Ciphers" from Applied Cryptography, Chapter 15.1, pp. 357 and 358. 1996.

* cited by examiner

*Primary Examiner*—Hosuk Song
(74) *Attorney, Agent, or Firm*—Hickman Palermo Truong & Becker LLP

(57) ABSTRACT

A method and apparatus are provided for processing a data packet. Policy data that specifies nested encapsulation may be identified based upon one or more attributes of the data packet. Based upon first policy data that specifies two or more encapsulations to be applied to a data packet, second policy data may be generated that specifies nested encapsulation to be applied to the data packet.

34 Claims, 7 Drawing Sheets

METHOD AND APPARATUS FOR GENERATING AND USING NESTED ENCAPSULATION DATA

FIELD OF THE INVENTION

This invention relates generally to packet-based communication systems and, more specifically, to the application of security services to data packets (hereinafter referred to as "packets").

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

In the context of packet-based communication networks, a security policy database (SPD) specifies the services that may be applied to data packets. Examples of security services include encapsulating a packet or discarding a packet. A SPD is typically consulted for each packet prior to transmittal of the packet. The SPD is searched based on a set of one or more attributes of a packet (i.e., "attribute keys or selectors"). A match is found if the packet possesses attributes that satisfy the constraints of some set of attribute key(s) or selectors in the SPD. Representative attribute keys include: (1) destination IP address, (2) source IP address, (3) protocol, (4) destination port, (5) source port and/or (6) other non-volatile or attributes of a packet. If a match is found, the SPD will specify the processing that is required to be applied to the packet. For example, the SPD may specify that (1) the packet should be discarded and not allowed to be transmitted further, (2) the packet may be transmitted without undergoing IPsec processing, or (3) the packet must undergo processing (e.g., security services), such as IPsec processing, prior to transmittal.

As stated above, if the SPD specifies that the packet must undergo processing prior to transmittal, the SPD will further specify the types of processing that are required to be applied to the packet. For example, the SPD could specify that the packet is to be encapsulated. If a SPD entry specifies that a packet having a certain attribute or set of attributes requires encapsulation, the encapsulation is performed on the packet to create an encapsulated packet. However, in light of an attribute or set of attributes of the encapsulated packet, the SPD may require further processing of the encapsulated packet (e.g., the encapsulated packet may also need to be encapsulated). As such, after the packet is encapsulated, the SPD must be searched again to determine if the SPD requires further processing of the encapsulated packet. In some instances, packets may need to be encapsulated many times, referred to as nested encapsulation. Performing nested encapsulation in this manner may consume a significant amount of computational and storage resources and time, particularly when a SPD is large.

Based on the foregoing, an approach for performing nested encapsulation in networks that does not suffer from the limitations of conventional approaches is highly desirable.

BRIEF DESCRIPTION OF THE DRAWINGS

The disclosed subject matter is depicted by way of representative examples, and not by way of limitation, in the depictions of the accompanying figures, which include.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. FUNCTIONAL OVERVIEW
II. GENERATING NESTED ENCAPSULATION DATA
III. USING NESTED ENCAPSULATION DATA
IV. IMPLEMENTATION DETAILS
V. EXTENSIONS AND ALTERNATIVES

I. Functional Overview

For a system that requires nested encapsulation, a method and apparatus are disclosed for processing a packet. The method and apparatus relate to generating, based upon one or more attributes of the packet, policy data that specifies nested encapsulation to be applied to the packet. A method and apparatus are also provided to use the nested encapsulation data, without having to perform iterative searches of a SPD.

II. Generating Nested Encapsulation Data

Figure 1:
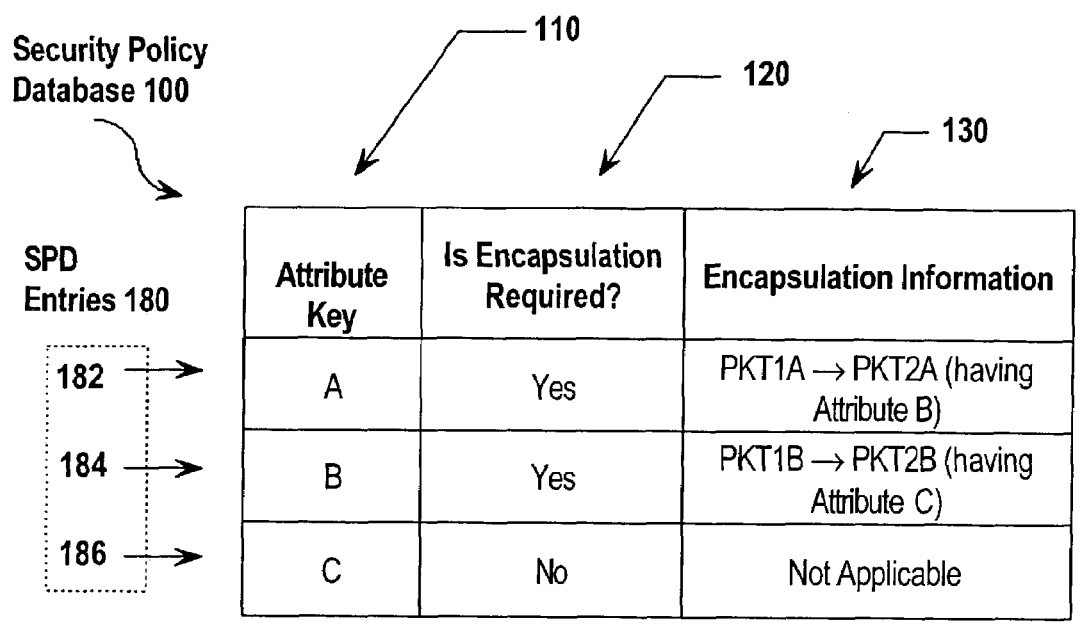
FIG. 1 is a block diagram that depicts an embodiment of a security policy database.

FIG. 1 is a table that depicts a SPD 100. SPD 100 is a database that specifies the processes, if any, that will be performed on a packet to implement specified security protocols. For each packet, SPD 100 is searched to determine whether a set of one or more attributes of the packet match a set of one or more attribute keys or selector in Attribute Key Column 110 of SPD 100. In an embodiment, in regard to IPsec processing, the SPD is searched using a 5-tuple of attributes including (1) destination IP address, (2) source IP address, (3) protocol, (4) destination port, and (5) source port. In an embodiment of IPsec processing, a match exists if all of the relevant packet attributes fall within the ranges of selector values for an SPD entry. If for one or more of the packet attributes, the value does not fall within the range of the selector values for a particular SPD entry, then there isn't a match in respect of the particular SPD entry. In other embodiments, or for other types of processing, various different attributes may be used as attribute keys.

If a match is found, the SPD Entry 180 for the particular set of attributes specifies the processing, if any, that is to be applied to the packet. As discussed above, a SPD Entry 180 may specify that (1) the packet should be discarded and not allowed to be transmitted further, (2) the packet may be transmitted without undergoing IPsec processing, or (3) the packet must undergo IPsec processing prior to transmittal.

If processing is required in respect of the packet, SPD 100 may contain columns such as Encapsulation Required Column 120 and Encapsulation Information column 130. Encapsulation Required Column 120 and Encapsulation Information Column 130 contain data that specifies whether a single encapsulation is to be performed, and, if so, how the encapsulation is to be performed. Encapsulation Required Column 120 indicates whether encapsulation is required for a particular SPD Entry 180. In some applications, Encapsulation Required Column 120 may not be used and instead, data contained in Encapsulation Information Column 130 may indicate whether encapsulation is required. Encapsulation Information Column 130 indicates what type of encapsulation is to be applied to a packet for a particular SPD Entry 180.

Figure 2:
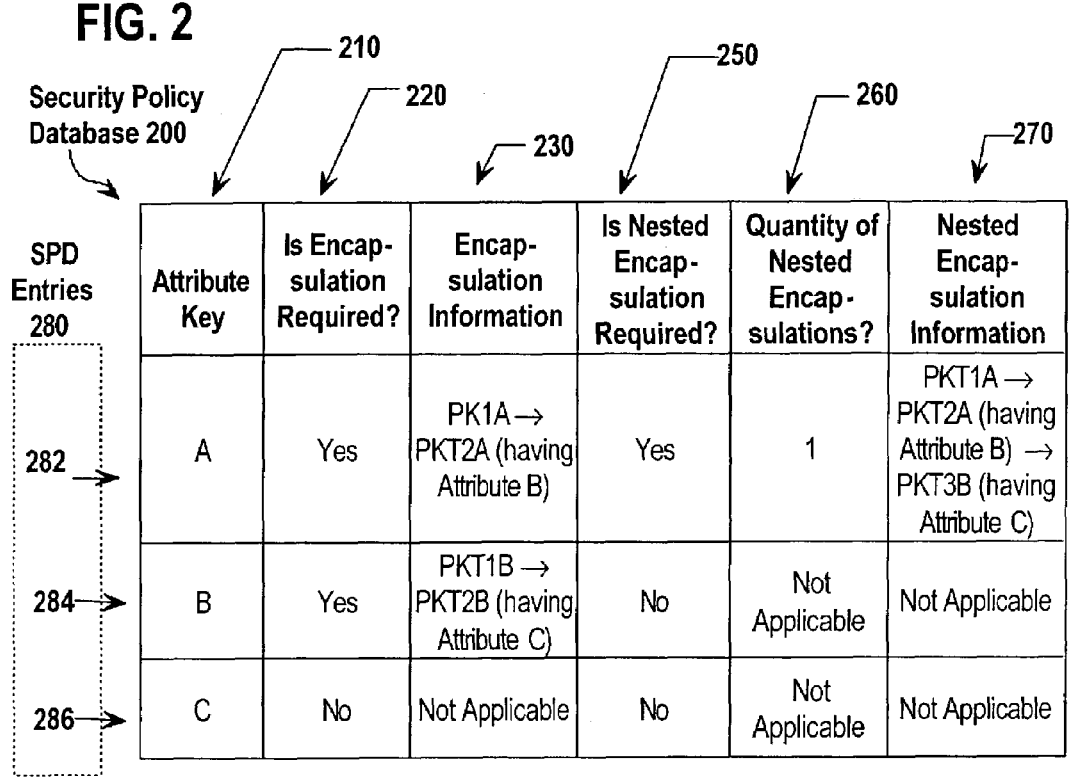
FIG. 2 is a block diagram that depicts an embodiment of a security policy database including nested encapsulation information.

At least one search of SPD 100 is required to determine that no encapsulation of a packet is required, and at least two searches of SPD 100 are required to determine that single encapsulation is required. For example, if SPD 100 is searched for Packet 1, and Packet 1 has a set of one or more attributes that matches attribute key set C, SPD Entry 186 is consulted to determine whether Packet 1 must be encapsulated. As shown in FIG. 2, SPD Entry 186 specifies that no encapsulation is needed. Accordingly, one search of SPD 110 was required to determine that no encapsulation of the Packet 1 was needed.

If encapsulation is required, however, even more searches of SPD 100 may be required. For example, if Packet 1 has a set of attributes that matches attribute key set B in SPD Entry 184, encapsulation of Packet 1 is required, and Packet 1 will be encapsulated to form Packet 2. But, after encapsulation of Packet 1 is performed, it is unknown whether, in light of one or more attributes of Packet 2, encapsulation of Packet 2 is also required. As such, SPD 100 will need to be searched a second time, to determine whether further encapsulation is required. If, for example, Packet 2 has a set of attributes that matches attribute key set C, SPD Entry 186 will be consulted to determine whether a Packet 2 must be encapsulated. SPD Entry 186 specifies that no encapsulation of Packet 2 is required, and, as a result, Packet 1 only needed to be encapsulated once. However, in order to determine that Packet 1 only needed be encapsulated once, SPD 100 had to be searched twice.

In some situations, SPD 100 must be searched multiple times to determine that multiple encapsulations of a packet are required. For example, if Packet 1 has attribute(s) that match attribute key set B in SPD Entry 184, encapsulation of Packet 1 is required, and Packet 1 is encapsulated to form Packet 2. However, as noted above, after encapsulation of Packet 1 is performed, it is unknown whether, in light of one or more attributes of Packet 2, encapsulation of Packet 2 is also required. As such, SPD 100 will need to be searched a second time, to determine whether further encapsulation is required. If Packet 2 has attribute key set A, a match will be found in SPD Entry 182, and SPD Entry 182 will be consulted to determine whether a Packet 2 must be encapsulated. SPD Entry 182 specifies that encapsulation is indeed required, and, as a result, Packet 2 will need to be encapsulated to form Packet 3. However, similar to the situation after encapsulating Packet 1 to form Packet 2, after encapsulation of Packet 2 is performed, it is unknown whether, in light of one or more attributes of Packet 3, encapsulation of Packet 3 is also required. As such, SPD 100 will need to be searched a third time, to determine whether further encapsulation is required. If Packet 3 has a set of attributes that match attribute key set C, a match will be found in SPD Entry 186, and SPD Entry 186 will be consulted to determine whether a Packet 3 must be encapsulated. SPD Entry 186 specifies that no encapsulation is required, and, as a result, no further encapsulation is required. Ultimately, in this example, two encapsulations were performed. However, in order to determine that Packet 1 required nested encapsulation (e.g., needed to ultimately be encapsulated twice), SPD 100 had to be searched three times, resulting in costly overhead.

According to one embodiment of the invention, a method and apparatus are provided for generating and maintaining nested encapsulation data in one or more data structures. Nested encapsulation data may include any policy data or other information relating to whether nested encapsulation is to be performed on packet, and, if nested encapsulation is to be performed, may include information regarding the manner in which the nested encapsulation will be performed. In this regard, nested encapsulation data may describe specific processing (e.g., security services to be applied to a packet). The data structure(s) that store the nested encapsulation data are referenced when a packet is processed to determine if nested encapsulation is required.

In an embodiment, using just one search of a SPD, based on at least one attribute of a packet, nested encapsulation data may be identified for the packet. In some embodiments, such as an embodiment used for IPsec processing, the search is based on a 5-tuple of attributes, as mentioned above. Being able to obtain nested encapsulation data in one search is a significant improvement over the method described above in respect FIG. 1, in which multiple searches of a SPD were required to obtain data regarding multiple encapsulations. This approach is applicable to any type of encapsulation and may be used to facilitate various tunneling protocols and combinations of tunneling and transport protocols. For example, the approach may be used to facilitate IPsec and generic routing encapsulation (GRE).

FIG. 2 depicts a SPD 200 configured to maintain nested encapsulation data according to one embodiment of the invention. Nested encapsulation data may be maintained in data structures that are included in, or associated with, SPD 200. For example, nested encapsulation data may be maintained in the fields of SPD 200, or it may be maintained in other data structures that are referenced by SPD 200. In one embodiment, nested encapsulation data is stored in a data structure such as a chain, tree, or upside-down tree. In one embodiment, these data structures store data that specifies processing (e.g., security services) to be applied to a packet matching the attribute key set of the SPD Entry 280. The approach described herein is not limited to a particular type of data structure, such as a tree or a chain, and, as such, examples of data structures described herein should be considered as illustrative of the disclosed subject matter, rather than considered restrictively. FIG. 2 depicts an embodiment of the invention in which nested encapsulation data is maintained in fields of SPD 200.

Nested encapsulation data and single encapsulation data may be stored in SPD 200. For example, SPD 200 may include a field that specifies a number of encapsulations that are to be performed. Such a field could store values that indicate: (1) zero encapsulations are to be performed; (2) a single encapsulation is to be performed, (3) nested encapsulations are to be performed, and/or (4) the specific number of nested encapsulations to be performed. In the embodiment depicted in FIG. 2, single encapsulation data and nested encapsulation data are maintained separately. Specifically, SPD 200 includes Attribute Key Column 210, which is used in searching SPD 200. In an embodiment, SPD 200 maintains Encapsulation Required Column 220 and Encapsulation Information Column 230, which both relate to single encapsulation data (e.g., policy data that requires a single encapsulation). In an embodiment, SPD also maintains Nested Encapsulation Required Column 250, Nested Encapsulation Quantity Column 260, and Nested Encapsulation Information Column 270.

For a specific SPD Entry 280, Nested Encapsulation Required Column 250 specifies whether a packet matching the attribute key set for the specific SPD Entry 280 will undergo nested encapsulation (e.g., will ultimately be encapsulated at least twice). A value in Nested Encapsulation Quantity Column 260 indicates a number of nested encapsulations to be applied to a packet matching the attribute key set for the specific SPD Entry 280. In respect of each specific SPD Entry 280, for which encapsulation is required, Nested Encapsulation Information Column 270 specifies the type and manner in which encapsulations will be applied to packets matching the attribute key set for the specific SPD Entry 280. According to another embodiment of the invention, the data in Nested Encapsulation Information Column 270 references a data structure external to SPD 200 that specifies the type and manner in which nested encapsulation is to be applied. For example, in an embodiment, such encapsulation information specifies an order in which various encapsulations are to be applied, characteristics of headers that will encapsulate the packet, encryption information, and/or other information related to encapsulation.

In an embodiment, nested encapsulation data is generated for all SPD Entries 280 prior to the processing of any packets. The nested encapsulation data may be generated at other times during the operation of a communication network, for example, prior to the processing of any packets, or upon the processing of a first packet. Thus the approach is not limited to establishing nested encapsulation data at a particular point in time. Additionally, nested encapsulation data may also be dynamically generated and/or updated to reflect changes in the communication network.

According to one embodiment of the invention, second policy data, such as nested encapsulation data, is generated based on first policy data, such as single encapsulation data. The first policy data may include at least two items of policy data, wherein the first item specifies encapsulation to be applied to any packet possessing at least one attribute found in the packet. The second item of policy data specifies encapsulation to be applied to any packet possessing at least one attribute that would be possessed by the packet following encapsulation according to the first item. The first and second items of policy data may each be single encapsulation data, or either or both of the items of policy data may be nested encapsulation data.

In the embodiment depicted in FIG. 2, nested encapsulation data is generated by examining single encapsulation data. In an embodiment, the single encapsulation data that is contained in Encapsulation Required Column 220 and Single Encapsulation Information Column 230 may be used to generate the nested encapsulation data that is maintained in Nested Encapsulation Required Column 250, Nested Encapsulation Quantity Column 260, and Nested Encapsulation Information Column 270. However, it is not necessary that the single encapsulation data that is used for generating the nested encapsulation data be maintained in a common or related data structure such as SPD 200. For example, a first database that maintains single encapsulation data may be used in the generation of nested encapsulation data, wherein the nested encapsulation data is stored in a second database, and the first database is destroyed or not used to process packets. As stated above, in an embodiment, single encapsulation data may be combined with nested encapsulation data and may be maintained in the same record of a data structure.

Figure 3:
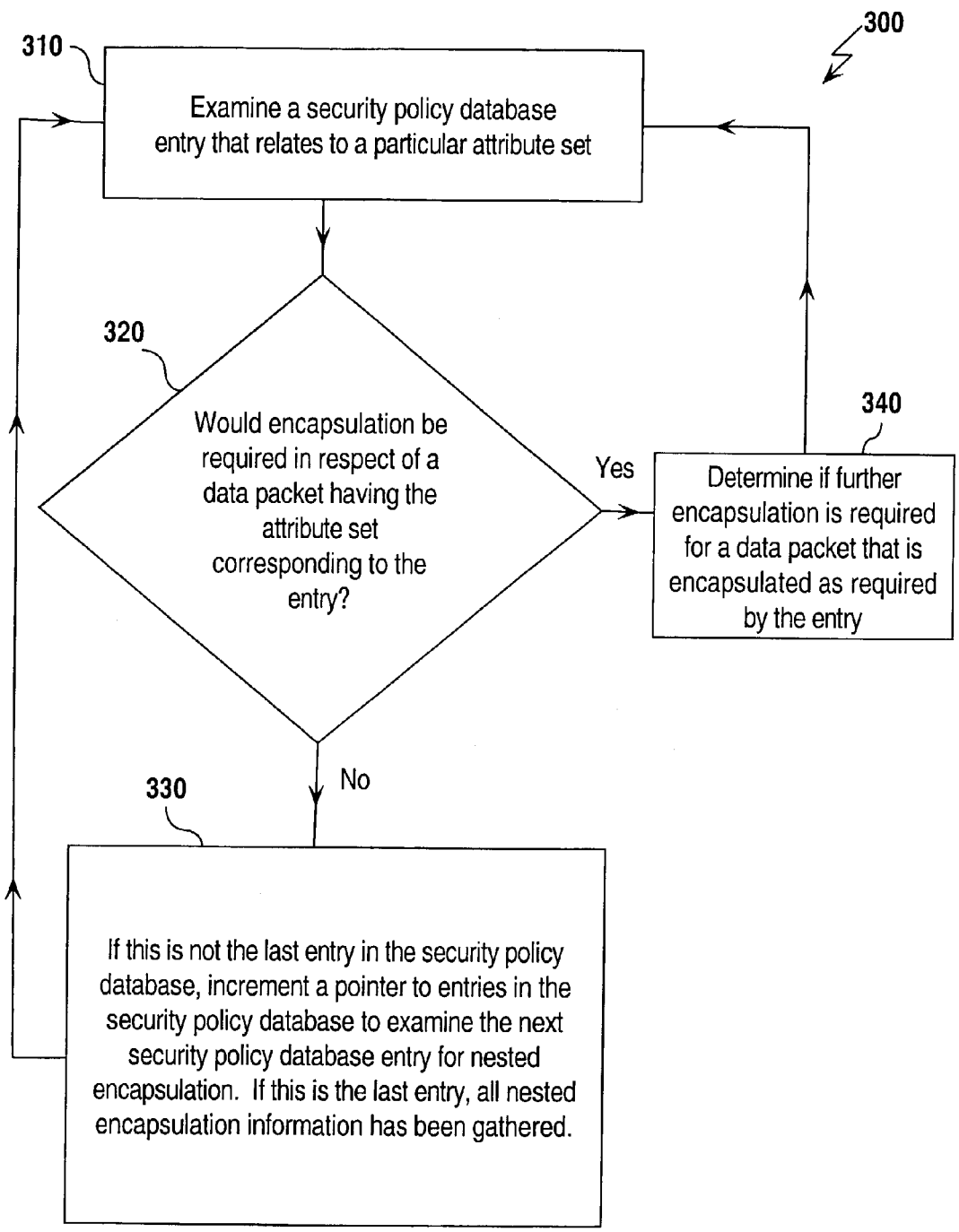
FIG. 3 is a flow chart that depicts an embodiment of a method for generating nested encapsulation information.

For the purposes of illustration, in FIG. 3, an embodiment of method 300 is described in which the nested encapsulation data in SPD 200 of FIG. 2 is generated based on the single encapsulation data that is maintained in SPD 200. According to an embodiment of the invention, prior to the processing of any packets, each SPD Entry 280 is examined to determine its respective nested encapsulation data.

In step 310, a SPD Entry 280 relating to a particular attribute key set is examined. In step 320, a determination is made whether encapsulation is required for a packet that has the key attribute(s) of the SPD Entry 280. If, in step 320, it is determined that the packet must be encapsulated, then according to step 330, SPD 200 is searched, from the top, to determine whether a set of attributes of the encapsulated packet matches a key attribute set in SPD 200. Thus, step 310 is then repeated for the encapsulated packet. Steps 310-330 are repeated as long as it is determined that further encapsulation is required.

When it is determined that no further encapsulation is required in step 320, then, in Step 340, a pointer to the SPD Entry 280 that was being examined is incremented to point to the next SPD Entry 280 in SPD 200. This process is repeated for each SPD Entry 280 in SPD 200.

A specific example of method 300 is described. Suppose that SPD Entry 282 requires encapsulation of a packet having attribute key set A. An examination is made of the type of packet that will result from an encapsulation based on the single encapsulation data for SPD Entry 282. If, for example, it is found that a packet encapsulated based on the single encapsulation data for SPD Entry 282, will have an attribute set matching attribute key set B, it can be further surmised that the resulting packet will match SPD Entry 284 and will also require encapsulation. The packet therefore will require nested encapsulation. An examination is then made of the type of packet that will result from the second encapsulation. If it is determined that the packet yielded by the second encapsulation has an attribute set matching attribute key set C, the packet yielded by the second encapsulation will match SPD Entry 286, and will not require further encapsulation. Therefore, the examination of SPD Entry 282 reveals that a packet that has an attribute set matching attribute key set A will require nested encapsulation, and, will specifically undergo encapsulation twice. Moreover, because the second encapsulation was dependent upon the first encapsulation, an examination of SPD Entry 282 provides information concerning encapsulation dependencies or orders in just one search of SPD 280. Additionally, information regarding multiple or nested encryption is also available. These items of data may be maintained in the Nested Encapsulation Required Column 250 and the Nested Encapsulation Quantity Column 260 in respect of SPD Entry 282. Information about the manner and type of encapsulations that a packet having an attribute set matching attribute key set A will undergo may be maintained in Nested Encapsulation Information Column 270 in respect of SPD Entry 282. As stated above, the encapsulation information may include the order of various encapsulations, characteristics of headers that will encapsulate the packet, encryption information, and/or other information related to encapsulation.

In an embodiment, as SPD Entries 280 are examined during the generation of nested encapsulation data, a dummy header is created and utilized to correspond to the type of packet that would match the particular SPD Entry 280 that is being examined. If required, the dummy header may be encapsulated and the encapsulated dummy header used to examine whether nested encapsulation is required. In one embodiment of the invention, each of remaining SPD Entries 280 is examined to determine the corresponding nested encapsulation data. If the examination of a SPD Entry 280 reveals that only a single encapsulation, or no encapsulation, is required for a packet having the attribute(s) corresponding to the SPD Entry, no nested encapsulation needs to be entered into columns of the particular SPD Entry 280 that relate to nested encapsulation. Alternatively, values may be maintained in the columns of the particular SPD Entry 280 that indicate that no encapsulations or zero encapsulations are to be performed.

Accordingly, after each SPD Entry 280 has been examined and nested encapsulation data has been generated for each SPD Entry 280, only one search of SPD 200 is required to determine the nested encapsulation data of a packet.

If there are changes to security policies, new nested encapsulation data may be generated to reflect the changes in the security policies. Changes in security policies include changes to policy data. The manner in which encapsulation is to be performed may be affected by the addition, removal or changing of security associations ("SA"). An SA is data in a Security Association Database ("SAD") that is referenced by SPD Entries 280. An SA indicates the type of processing to be applied to a packet.

New nested encapsulation data may be generated by examining, in the manner described above, at least one SPD Entry 280 in the SPD 200. The new nested encapsulation data may be maintained in SPD 200, and may replace existing nested encapsulation data. If a new security policy is introduced, a chain of nesting information may be affected, and the chain may need to be rebuilt.

III. Using Nested Encapsulation Data

Figure 4:
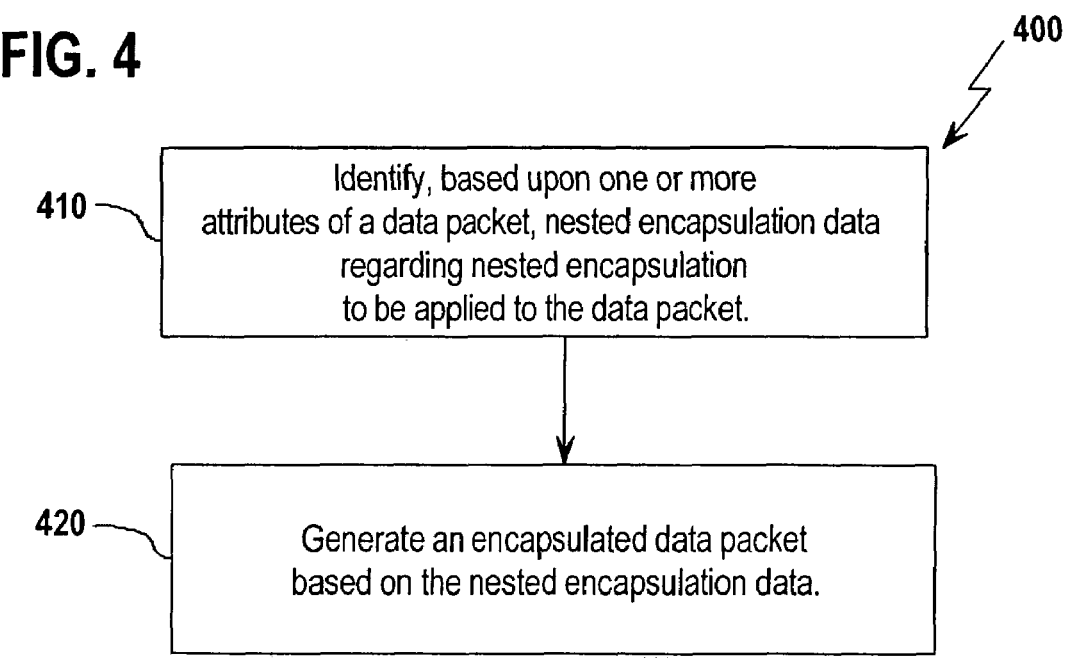
FIG. 4 is a flow chart that depicts an embodiment of a method for using nested encapsulation information.

FIG. 4 depicts an embodiment of method 400 for generating a packet with nested encapsulation using SPD 200. In step 410, nested encapsulation data relating to a particular packet is identified in SPD 200. The nested encapsulation data stored in SPD 200 was generated according to the methods described above. In step 420, an encapsulated packet is generated based on the nested encapsulation identified in step 410.

After the nested encapsulation data has been generated, when a packet is processed, the nested encapsulation data may be identified by conducting only one search of SPD 200. For example, if a packet is received that has an attribute set matching attribute key set A, a single search of SPD 200 provides a match to the attribute key set in SPD Entry 282. After locating this match in SPD Entries 280, various items of nested encapsulation data will be available without having to conduct additional searches, as were required with conventional approaches. Specifically, after the single search of SPD 200, data is available indicating that (i) nesting is required for the packet, (ii) there will be one nested encapsulation (e.g., two total encapsulations will be performed), and (iii) the manner and type of encapsulation that will be applied to the packet. This approach eliminates the overhead of doing multiple searches of SPD 200 each time a packet is processed.

Figure 5A:
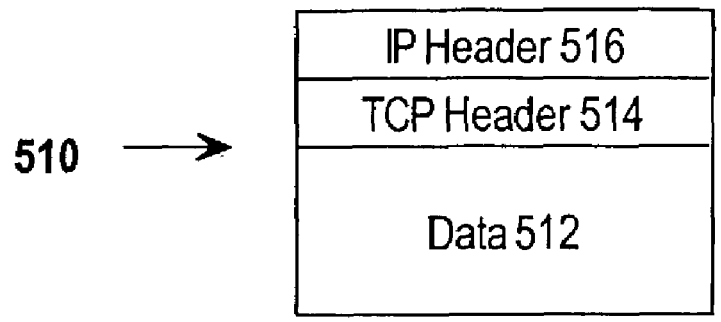
FIG. 5A depicts an embodiment of an unencapsulated packet.
Figure 5B:
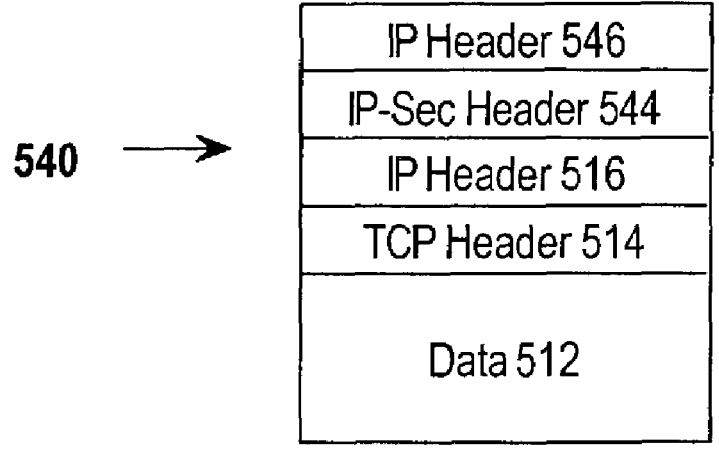
FIG. 5B depicts an embodiment of a packet that has undergone a single encapsulation.
Figure 5C:
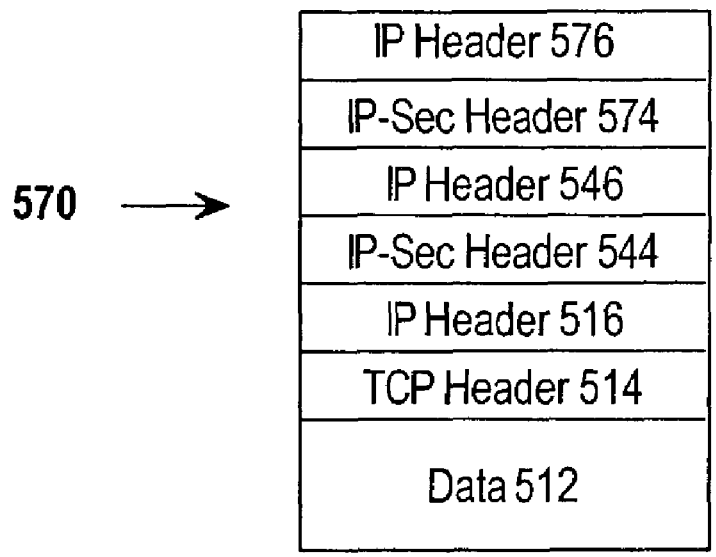
FIG. 5C depicts an embodiment of a packet that has undergone nested encapsulation.

The packet may then be encapsulated based on the nested encapsulation data, and then transmitted. FIG. 5A is a block diagram that depicts a packet 510 that has not yet been encapsulated. Packet 510 includes data 512, a TCP header 514, and an IP header 516. FIG. 5B is a block diagram that depicts an encapsulated packet 540, which is generated by encapsulating packet 510. Packet 510 was encapsulated with IPsec header 544 and IP header 546 to create encapsulated packet 540. FIG. 5C is a block diagram that depicts packet 570 that has undergone nested encapsulation. Encapsulated packet 540 was encapsulated by IPsec header 574 and IP header 576 to create packet 570.

Encapsulation may include, multiple encapsulations or a single comprehensive encapsulation. In an embodiment, encapsulation conforms to the IPsec protocol. The nested encapsulation data may be used for either outbound traffic (for encapsulation) or for inbound traffic (for de-encapsulation). This method is particularly useful for the transmittal of packets over a virtual private network.

IV. Implementation Details

The approach for generating and using nested encapsulation data described herein may be implemented in a variety of ways and the invention is not limited to any particular implementation. The approach may be integrated into a router or other network element, or may be implemented as a stand-alone mechanism. Furthermore, the approach may be implemented in computer software, hardware, or a combination thereof.

Figure 6:
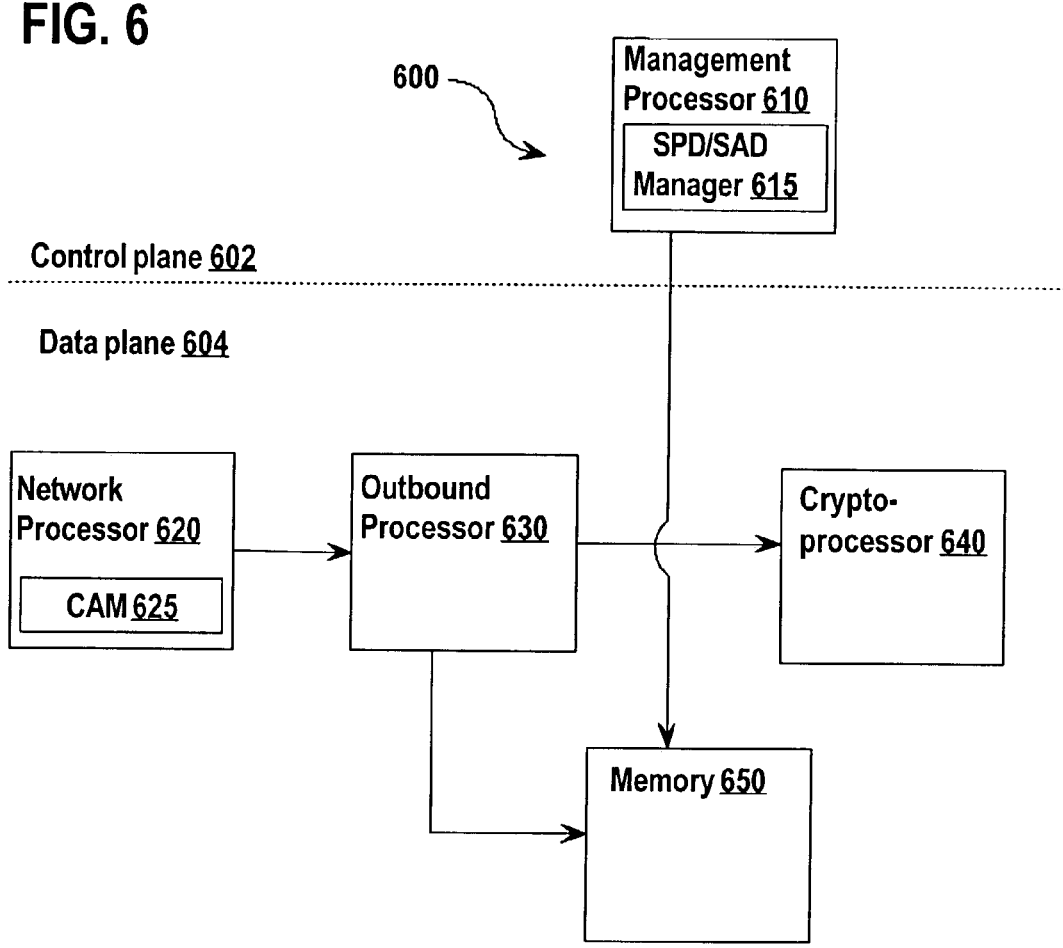
FIG. 6 is a block diagram that depicts an embodiment of a system for generating nested encapsulation information.

FIG. 6 is a block diagram that depicts a system that uses nested encapsulation data. System 600 includes a control plane 602 and a data plane 604. Control plane 602 includes a management processor 610. In an embodiment, management processor 610 is configured to execute a software module that is a SPD/SAD manager 615. Management processor 610 and SPD/SAD manager 615 manages the negotiation of the SPD and/or SAD. The SPD/SAD manager 615 handles database update events, and maintains the nesting information. Events include, but are not limited to, SP create, SP delete, SA create and SA delete.

Data plane 604 includes a network processor 620. In an embodiment, network processor 620 includes a content addressable memory (CAM) 625 that stores portions of the SPD and SAD, such as, in an embodiment, the attribute key sets specified by the SPD and SAD. Other SPD and SAD information may be stored in other memory. Data plane 604 also includes an outbound CPU 630. Outbound CPU 630 applies encapsulation to outbound packets prior to transmittal. Data plane 604 includes a crypto-processor 640 configured for encrypting packets prior to transmittal.

Data plane 604 also includes a memory 650. The data structures that maintain nested encapsulation data that are used in the generation of nested encapsulation data, may be stored in memory 650. Memory 650 may be implemented using any type of storage, such as a cache or other similar device.

After a packet is received, network processor 620 searches SPD entries in CAM 625 for matching key attributes. If a match is found, nested encapsulation data relating to the SPD entry is available, even though only one search of CAM 625 was made. In an embodiment, the nested encapsulation data is stored in memory 650. The output of the search in the CAM 625 is an index to a "context RAM"

that holds at least a portion of the security policy information or another index into a database of SAs in memory.

After the nested encapsulation data for the packet is examined, the packet may be encapsulated and encrypted by outbound processor 630 and crypto-processor 640. Encapsulation and/or encryption may be based on the nested encapsulation data. The packet may then be transmitted.

Figure 7:
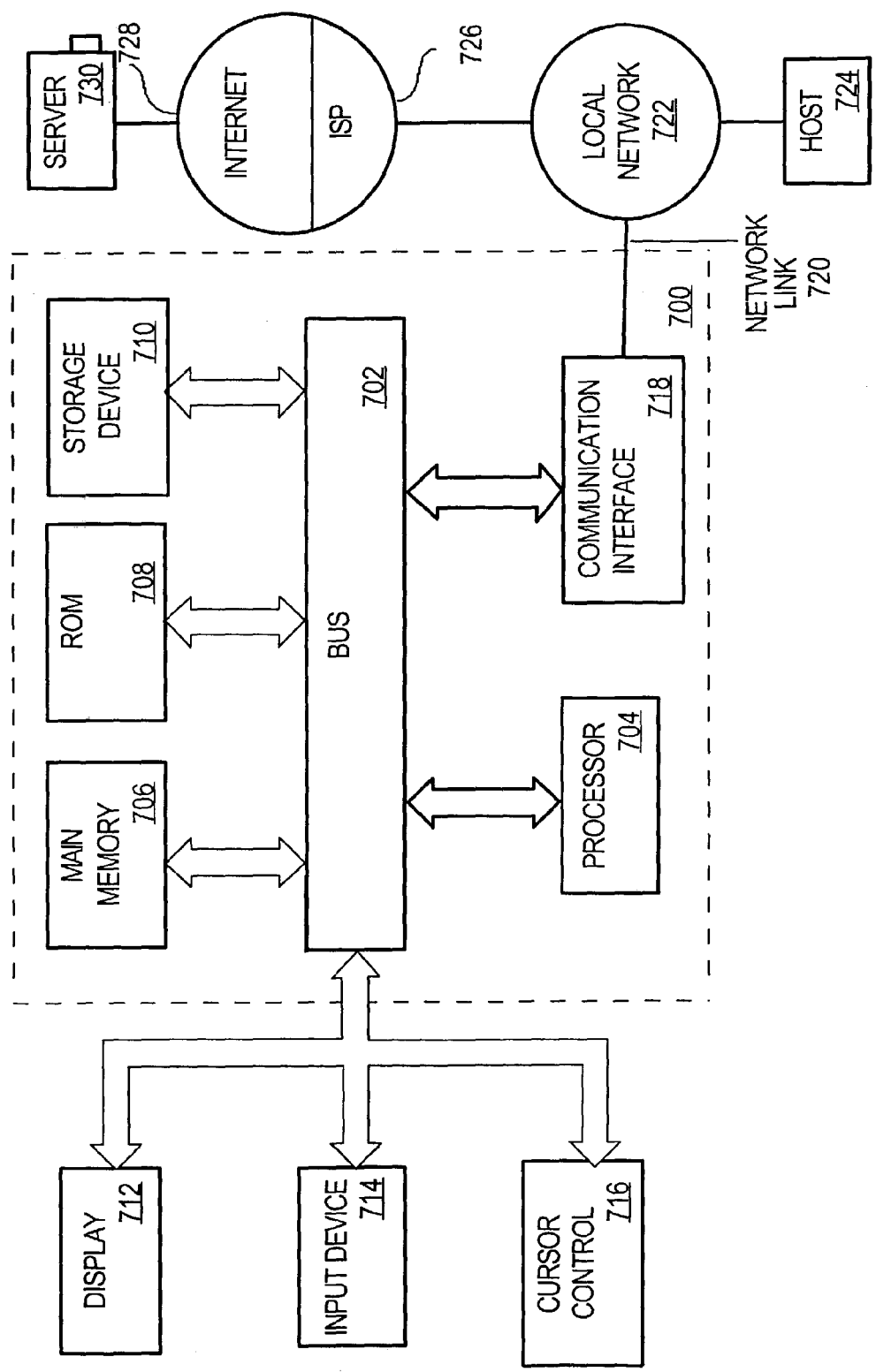
FIG. 7 is a block diagram that depicts an embodiment of a system that may be used to implement the disclosed subject matter.

FIG. 7 is a block diagram that depicts an example computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any storage medium that participates in providing instructions to processor 704 for execution. Such a storage medium may take many forms, including but not limited to, non-volatile media, and volatile media. Non-volatile media includes, for example, optical or magnetic disks, such as storage device 710. Volatile media includes dynamic memory, such as main memory 706.

Common forms of computer-readable media include, for example, a floppy disk, a flexible disk, hard disk, magnetic tape, or any other magnetic medium, a CD-ROM, any other optical medium, punch cards, paper-tape, any other physical medium with patterns of holes, a RAM, a PROM, and EPROM, a FLASH-EPROM, any other memory chip or cartridge, or any other storage medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

V. Extensions and Alternatives

In the foregoing specification, the invention has been described with reference to specific embodiments thereof. It will, however, be evident that various modifications and changes may be made thereto without departing from the broader spirit and scope of the invention. For example, although examples have depicted the use of fields in SPD 280 for maintaining nested encapsulation data, the fields and SPD 280 are used for explanation purposes only as embodiments of the invention are not limited to any particular type of data structure or field in a data structure. Thus, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Furthermore, other embodiments may use more or fewer steps than those discussed herein.

The invention claimed is:

1. A method for processing a data packet in a communications network, the method comprising a computer-implemented steps of:
receiving a data packet;
identifying, based upon one or more attributes of the data packet, policy data that specifies nested encapsulation to be applied to the data packet; and
transforming the data packet based in part on said policy data;
wherein the policy data specifies first and second encapsulations to be applied to the data packet, and wherein the second encapsulation depends upon results of the first encapsulation.

2. The method as recited in claim 1, wherein the policy data specifies that a first encapsulated data packet be generated based upon an attribute of the data packet and that a second encapsulated data packet be generated based upon an attribute of the first encapsulated data packet.

3. The method as recited in claim 1, wherein the policy data specifies two or more different encryptions to be applied to the data packet.

4. The method as recited in claim 1, wherein the policy data further specifies a quantity of encapsulations to be applied to the data packet.

5. The method as recited in claim 1, wherein the policy data further specifies an order of two or more encapsulations to be applied to the data packet.

6. The method as recited in claim 1, further comprising a computer-implemented step of generating an encapsulated data packet based upon the data packet and the policy data.

7. The method as recited in claim 1, further comprising a computer-implemented step of generating an encapsulated data packet based upon the data packet and the policy data, wherein the step of generating an encapsulated data packet includes performing two or more encapsulations.

8. The method as recited in claim 1, further comprising a computer-implemented step of generating an encapsulated data packet based upon the data packet and the policy data, further comprising the computer-implemented step of transmitting the encapsulated data packet onto a virtual private network.

9. The method as recited in claim 1, wherein the one or more attributes include one or more of a destination Internet Protocol (IP) address, a source IP address, a destination port, a source port and a protocol.

10. The method as recited in claim 1, wherein the policy data specifies an encapsulation that conforms to the IP-sec protocol.

11. A method for generating policy data for data packet processing in networks, the method comprising the computer-implemented steps of:
generating, based upon first policy data that specifies encapsulations to be applied to data packets based upon one or more attributes of the data packets, second policy data that specifies nested encapsulation to be applied to the data packets; and
storing said second policy data in a security policy database, wherein:
the first policy data comprises two items of policy data,
wherein the first item specifies encapsulation to be applied to any data packet possessing at least one attribute found in the data packet, and
wherein the second item of policy data specifies encapsulation to be applied to any data packet possessing at least one attribute that would be possessed by the data packet following encapsulation according to the first item.

12. The method as recited in claim 11, wherein the policy data specifies first and second encapsulations to be applied to the data packet, wherein the second encapsulation depends upon results of the first encapsulation.

13. The method as recited in claim 11, wherein the policy data specifies that a first encapsulated data packet be generated based upon the data packet and that a second encapsulated data packet be generated based upon the first encapsulated data packet.

14. The method as recited in claim 11, wherein the policy data specifies two or more different encryptions to be applied to the data packet.

15. The method as recited in claim 11, wherein the policy data further specifies a quantity of encapsulations to be applied to the data packet.

16. The method as recited in claim 11, wherein the policy data further specifies an order of two or more encapsulations to be applied to the data packet.

17. The method as recited in claim 11, further comprising the computer-implemented step of generating an encapsulated data packet based upon the data packet and the policy data.

18. The method as recited in claim 17, wherein the step of generating an encapsulated data packet includes performing two or more encapsulations.

19. The method as recited in claim 17, further comprising the computer-implemented step of transmitting the encapsulated data packet onto a virtual private network.

20. The method as recited in claim 11, wherein the one or more attributes include one or more of a destination Internet Protocol (IP) address, a source IP address, a destination port, a source port and a protocol.

21. The method as recited in claim 11, wherein the policy data specifies an encapsulation that conforms to the IP-sec protocol.

22. The method as recited in claim 11, wherein the step of generating is performed in response to a change in policy data.

23. An apparatus for processing a data packet in a communications network, said apparatus comprising logic encoded in one or more computer-readable storage media for execution and when executed operable to:
receive a data packet;

identify, based upon one or more attributes of the data packet, policy data that specifies nested encapsulation to be applied to the data packet; and transform the data packet based in part on said policy data, wherein the policy data specifies first and second encapsulations to be applied to the data packet, and wherein the second encapsulation depends upon results of the first encapsulation.

24. The apparatus recited in claim 23, wherein the policy data specifies that a first encapsulated data packet be generated based upon an attribute of the data packet and that a second encapsulated data packet be generated based upon an attribute of the first encapsulated data packet.

25. The apparatus recited in claim 23, wherein the policy data specifies two or more different encryptions to be applied to the data packet.

26. The apparatus as recited in claim 23, wherein the policy data further specifies an order of two or more encapsulations to be applied to the data packet.

27. The apparatus recited in claim 23, further configured to generating an encapsulated data packet based upon the data packet and the policy data.

28. An apparatus for generating policy data for data packet processing, the apparatus configured to generate, based upon first policy data that specifies encapsulations to be applied to a data packet based on one or more attributes of the data packet, second policy data that specifies nested encapsulation to be applied to the data packet; and storing said policy data in a security policy database wherein:

the first policy data comprises two items of policy data,
wherein the first item specifies encapsulation to be applied to any data packet possessing at least one attribute found in the data packet, and
wherein the second item of policy data specifies encapsulation to be applied to any data packet possessing at least one attribute that would be possessed by the data packet following encapsulation according to the first item.

29. The apparatus recited in claim 28, wherein the policy data specifies first and second encapsulations to be applied to the data packet, wherein the second encapsulation depends upon results of the first encapsulation.

30. The apparatus recited in claim 28, wherein the policy data specifies that a first encapsulated data packet be generated based upon the data packet and that a second encapsulated data packet be generated based upon the first encapsulated data packet.

31. The apparatus recited in claim 28, wherein the policy data specifies two or more different encryptions to be applied to the data packet.

32. The apparatus recited in claim 28, wherein the policy data further specifies a quantity of encapsulations to be applied to the data packet.

33. The apparatus recited in claim 28, wherein the policy data further specifies an order of two or more encapsulations to be applied to the data packet.

34. A computer-readable storage medium storing one or more sequences of instructions which, when executed by one or more processors, causes the one or more processors to perform;

receiving a data packet;

identifying, based upon one or more attributes of the data packet, policy data that specifies nested encapsulation to be applied to the data packet; and transforming the data packet based in part on said policy data wherein the policy data specifies first and second encapsulations to be applied to the data packet, and wherein the second encapsulation depends upon results of the first encapsulation.

* * * * *